Sept. 13, 1966 A. STURNICH 3,272,584
KINEMATOGRAPHIC PROJECTING APPARATUS INCORPORATING A SCREEN
Filed Nov. 18, 1963 3 Sheets-Sheet 1
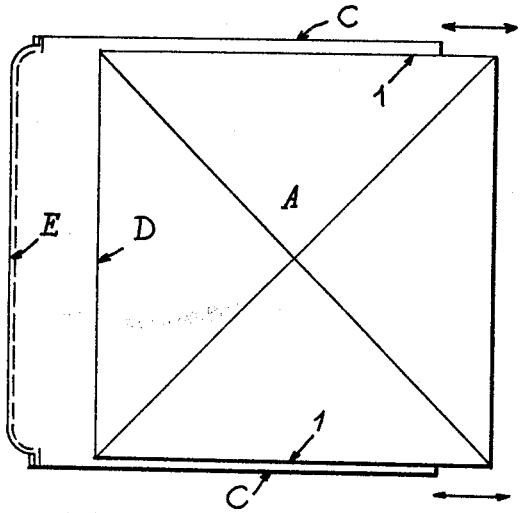
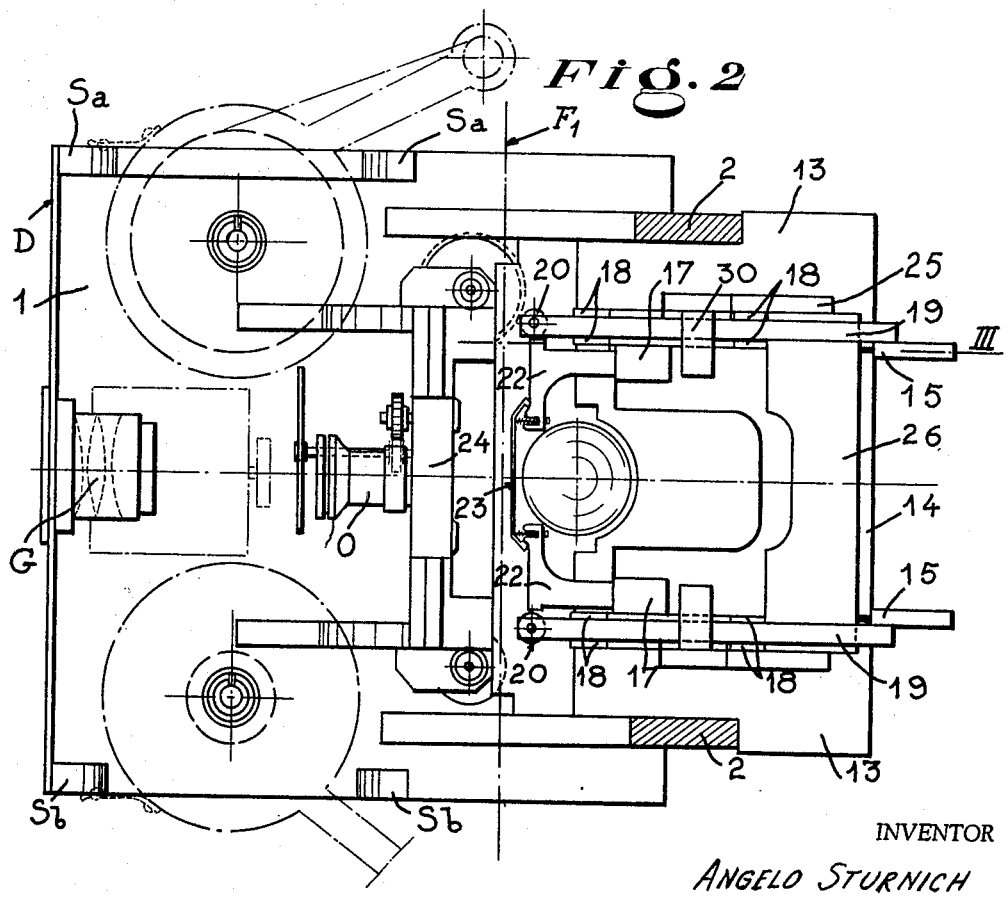
INVENTOR
ANGELO STURNICH
BY Irwin S. Thompson
ATTORNEY

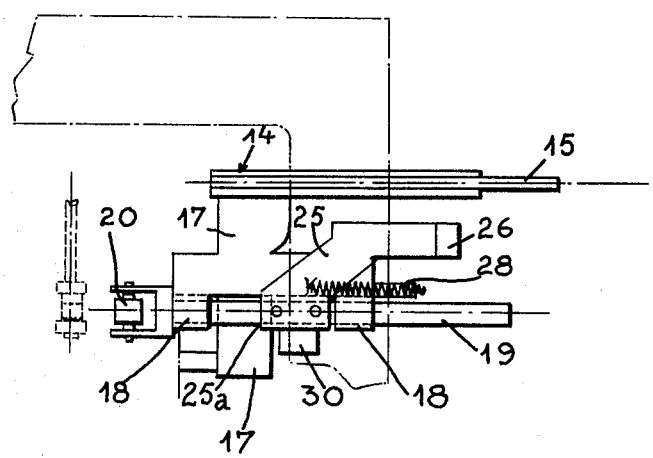
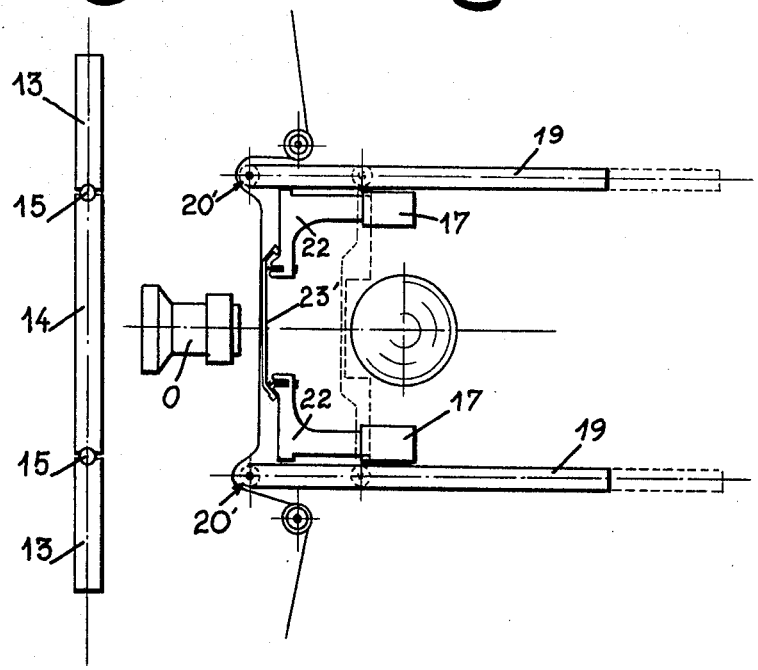

Sept. 13, 1966 A. STURNICH 3,272,584
KINEMATOGRAPHIC PROJECTING APPARATUS INCORPORATING A SCREEN
Filed Nov. 18, 1963 3 Sheets-Sheet 3
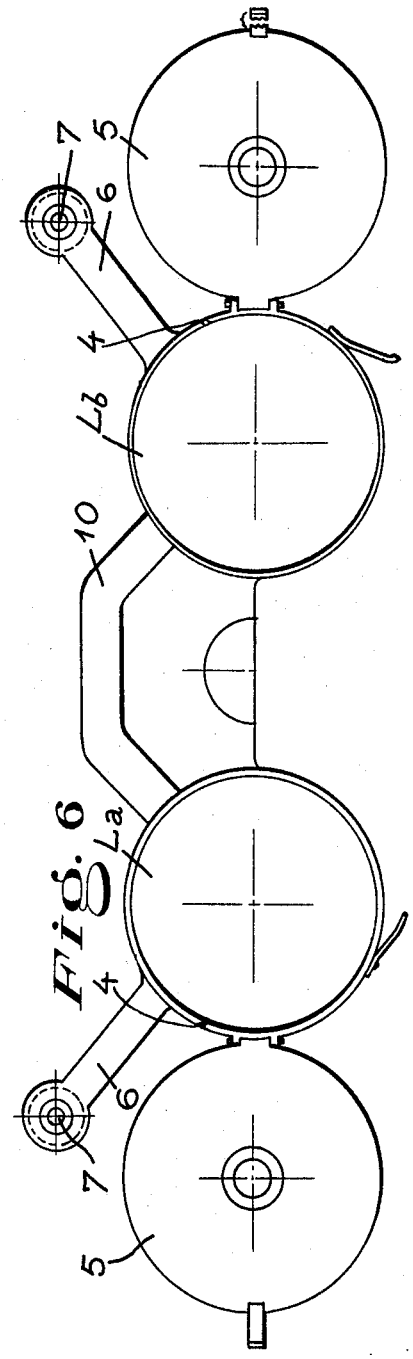
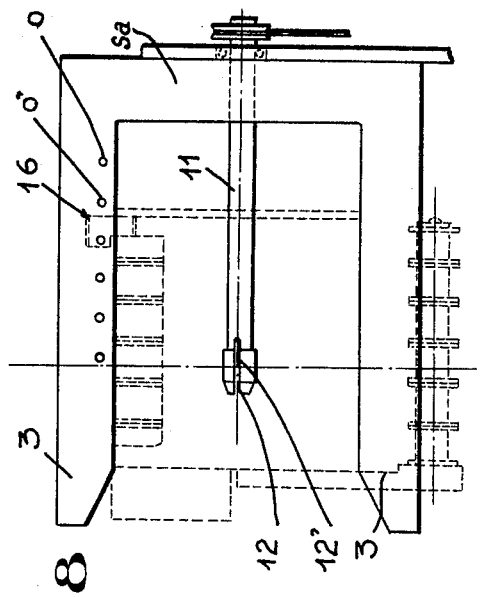
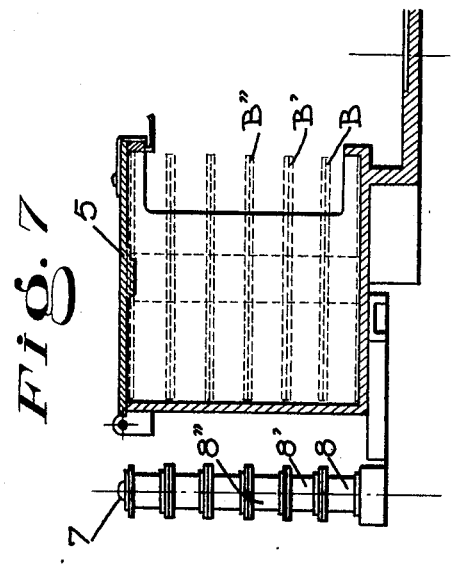
INVENTOR
ANGELO STURNICH
BY
*Irvin S. Thompson*
ATTORNEY

United States Patent Office 3,272,584
Patented Sept. 13, 1966

3,272,584
KINEMATOGRAPHIC PROJECTING APPARATUS
INCORPORATING A SCREEN
Angelo Sturnich, 7 Rue Martin Seytour, Nice, France
Filed Nov. 18, 1963, Ser. No. 324,408
Claims priority, application France, Nov. 23, 1962,
7,135, Patent 1,344,587
6 Claims. (Cl. 352—123)

My invention has for its object an apparatus for projecting kinematographic films, said apparatus incorporating a screen similar to that of a conventional televisor and the bulk of which is however reduced so that it is readily portable and may thus allow projecting a film anywhere where electric current is available without it being necessary to provide a location for setting up a conventional canvas screen at a distance from the projector. My improved apparatus may receive various applications such as the commercial showing of machines, plants, methods, novel articles and the like in industrial or commercial concerns, or even at private houses.

To this end, and in accordance with my invention, the whole projecting system is housed inside a frame carried in its turn removably in a case which is open at its rear end to provide a passage for the frame in its operative expanded condition, while the front surface of the case is formed by the actual screen; the frame carries in its front section ahead of the objective and of the projector shutter a divergent optical system adapted to make the projected image cover the whole screen in spite of the comparatively reduced distance separating the objective from the screen. The frame in its portable condition is collapsed within the case, in adjacent relationship with the screen, whereby the total bulk is reduced, while the different parts of the projector are suitably protected. When it is desired to project a film, the frame is drawn out rearwardly so as to shift the objective away from the screen and, by reason of the divergent optical means inserted in the path of the luminous projecting beam, said drawing out movement is limited.

A further feature of the invention consists in that the apparatus is designed so that the frame of the projector may carry a multiplicity of film spools and the different films on said spools may be projected in sequence with a very short interval between the projections of the successive films. To this end, the feed and take up spools provided for each film are carried respectively in alignment by two spindles extending transversely with reference to the projecting axis and along which the spools are adapted to slide so that the films may be brought in succession into registry with the vertical plane passing through the projecting axis. During the shifting of the spools, the film is stretched between its spools along a straight line slightly to the rear of the objective between two guiding pulleys over which the film passes so that it may be shifted transversely of the optical axis without meeting any hindrance; this being done, the film loops are formed and the film is brought into the accurate longitudinal position in the desired relationship with reference to the carrier member for the projecting optical means by a hand-operated push-button system.

The accompanying drawings illustrate, by way of example, a preferred embodiment of such an apparatus operating with a multiplicity of films. In said drawings:

FIG. 1 is a general outer view of the apparatus.
FIG. 2 is a lateral elevational view of the different parts carried inside the frame of the apparatus.
FIG. 3 is a partly sectional horizontal view through line III—III of FIG. 2 showing the push button system adapted to set a film in its operative position.
FIG. 4 is a partial rear view thereof.
FIG. 5 is an elevational view corresponding to FIG. 3.
FIGS. 6 to 8 are figures showing the part of the apparatus provided with the holders and the supporting means for the spools, FIG. 6 showing same from the same side as FIG. 2, while FIG. 7 is a cross-section of a spool holder and FIG. 8 a corresponding plan view.

In FIG. 1, the entire mechanical and optical means of the projecting apparatus are shown as carried by a frame illustrated diagrammatically as a rectangle A which is slidingly housed inside a case C the rear end of which is open while its front surface E is constituted by a screen similar to that of a televisor. A guiding and abutment system of any suitable known type which is not illustrated allows shifting the front section D of the frame A (FIG. 2) towards and away from the screen E to set it at the desired distance therefrom.

The frame A includes two side walls 1 connected along their front edges by a wall D carrying the divergent optical means G (FIG. 2) while the rear ends of the side walls are connected by transverse members 2. One of the side walls 1 carries at its upper and lower ends fittings designated respectively by $Sa$ and $Sb$ adapted to form a supporting system for the spools and spool holders. As illustrated in FIG. 8, each fitting is bent into U-shape and the two arms 3 of the U-shaped fitting extend perpendicularly to the vertical plane passing through the optical axis of the projector and form slideways along which the twin spool holders may be shifted across said vertical plane.

FIGS. 6 and 7 show the structure of said spool holders constituted by two cylindrical holders or housings $La$ and $Lb$ carrying respectively the feed spools and the take up spools. Each of said housings is obviously open along its periphery as shown at 4 so as to provide a passage for the films. It is closed at one end by a removable cover 5 and is rigid with an outer arm 6 carrying a lateral rod provided with a plurality of small guiding pulleys 8, 8', 8" adapted to guide the films on the corresponding spools B, B', B" which spools are adapted to revolve freely inside the housings $La$, $Lb$. The latter are associated and rigidly secured to each other by an arcuate connecting member 10, so that the whole arrangement including the spools may slide bodily along the arms 3 of the stationary fittings or supports $Sa$ and $Sb$, which allows bringing in succession the films on the different spools into their projecting position. During this sliding movement, the spool which is in its operative position ready for projection, is coaxially fitted on the end 12 of a spindle 11 revolvably carried in the frame 1 and connected through a suitable system of pulleys and belts with the motor driving the projector, the spool being held in position by a spring 12' engaging a groove in the spool. Only the spool which is fitted on the end 12 revolves, since the other spools are carried loose by the spindle 11. The transverse location of the spool holders and of the spools is defined stepwise by an arrangement of a well-known type such as a ball housed inside a recess formed in the holder or housing and urged by a spring 16 into one of the recesses $o$, $o'$ formed in one of the stationary slideways 3 of the support $Sa$.

In order that this shifting of the spools from one position to the next position may be possible, it is necessary for the films shifted between $La$ and $Lb$ to progress without their meeting any hindrance and, to this end, the outer film-engaging arms 6 on the upper spool holder $La$ and on the lower spool holder $Lb$ are sized and positioned in a manner such that a film stretched along a straight line between said holders lies to the rear of all possible hindrances as illustrated by the dot-and-dash line at F1 in FIG. 2.

My invention includes also an arrangement which allows modifying said initial rectilinear position of the film with a view to forming the desired loop and to setting the section of the film extending between the spools in its projecting position in adjacent relationship with the support of the projector objective O.

The frame includes to this end two vertically spacer upper and lower plates 13, 13' (FIGS. 2 and 4) secured for instance to the cross-members 2 and extending in a same vertical plane passing through the optical axis of the projector. Between said two stationary plates 13 and in the same plane as the latter is arranged a vertical plate 14 adapted to be shifted in a horizontal direction in said plane. The adjacent edges of the plates 13 and 14 are grooved and rods 15 are inserted respectively in the corresponding grooves of the upper plate 13 and of the plate 14 on the one hand and of the lower plate 13 and of the plate 14, on the other hand, said rods being secured by screws or otherwise to the stationary plates 13. The movable plate 14 may thus slide along the rods 15 and is urged rearwardly for instance by a spring. The sliding plate 14 is rigidly secured through the agency of flat connecting members 17 (FIGS. 2 and 3) to two pairs of forks 18 inside which are fitted and may slide axially two rods 19 carrying each at its front end a roller 20. The rods 19 cannot slide out of the open forks 18 as provided by the presence of stops 30 on the flat members 17. The part to be played by the rollers 20 consists in forming the loops of the film between two free wheels revolving in opposite directions 31, 32 and engaging the perforations in the film, the wheel 31 being driven by the projector motor.

On the other hand, the sliding plate 14 carries through its connecting members 17 (as shown in FIGS. 2 and 5), two angle pieces 22 which are interconnected by an elastic plate 23 the part played by which consists in urging the film against the operative carrier 24 of the objective, said elastic plate being suitably incurved or recessed in its middle, so as to allow the luminous beam to pass onto the objective.

Lastly, the rods 19 carry outer members 25 which are interconnected by a cross-member 26 forming a push member which allows shifting the system including the two rods 19 forwardly over the forks 18.

The operation of the apparatus is as follows: the different parts being in their inoperative positions illustrated in solid lines in FIG. 2, that is there being an empty space available through which the film may be shifted transversely, the desired film is first brought into registry with the objective, after which it is sufficient to depress the push member 26. The two rods 19 slide then along the forks 18 without carrying the latter along with them and they urge their rollers 20 forwardly, which makes them progress with reference to the film presser plate 23 until the terminal sections 25a of the member 25 abut against the front forks 18 (FIG. 3). From this moment onwards, the continuation of the movement of the push member has for its result to shift forwardly not only the rollers 20 which are brought into their position 20' (FIG. 5), but also the member 17 carrying the forks 18 and, together with the latter, the movable plate 14 carrying the elastic plate 23 which enters the position illustrated at 23' (FIG. 5). When the push member 26 is released, it is urged rearwardly by a spring 28 (FIG. 3), together with the rollers 20, so as to release the film loop, but the presser plate 23 rigid with the plate 14 remains in position. When the film has been projected, it is sufficient to draw the plate 14 rearwardly so as to return all the parts into their original inoperative positions.

Obviously, the structural arrangements disclosed may be modified without widening unduly thereby the scope of the invention as defined in the accompanying claims.

What I claim is:

1. A kinematographic film projecting apparatus comprising a frame, an objective carried inside said frame, a divergent optic system located to the front and at a short distance from the objective inside the frame, means projecting a beam of light through and along the optical axis of the objective and optic system, a case in which the frame is slidably carried and including a screen forming front wall facing the divergent optic means in the frame, the case being open at its rear end to provide a passage for the frame between a front inoperative position and a rearwardly shifted operative position, two cylindrical rigidly interconnected spool holders carried by the frame the axes of which are parallel with each other and orthogonal with reference to the optical axis of the objective, coaxial film feeding spools having their axes aligned with the axis of one spool holder and slidingly carried inside the latter, coaxial film take up spools cooperating with the corresponding film feeding spools having their axes aligned with the axis of the other spool holder and slidingly carried inside the latter, and guides extending in parallelism with the spool holder axes and along which said spool holder axes are adapted to be shifted to make the medial cross-sections of the successive pairs of cooperating feed and take up spools enter a position for which they lie in a plane passing through said optical axis to hold the corresponding film in an operative position across said axis.

2. In the apparatus claimed in claim 1, the combination of a film presser plate, a guideway parallel with the optical axis of the objective and along which said film presser plate is adapted to be shifted in the space separating the latter from the beam-projecting means, between a forward position for which said plate holds the cooperating film in its operative position adjacent the objective and a rear position to the rear of the location of said film extending rectilinearly between the corresponding spools.

3. In the apparatus claimed in claim 1, the combination of a film presser plate, a guideway parallel with the optical axis of the objective and along which said film presser plate is adapted to be shifted in the space separating the latter from the beam-projecting means between a forward position for which said plate holds the cooperating film in its operative position adjacent the objective and a rear position to the rear of the location of said film extending rectilinearly between the corresponding spools, a longitudinal slideway, a pusher member slidingly carried inside said slideway and adapted when operated to shift the medial section of said film forwardly to form a loop extending into proximity with the objective.

4. In the apparatus claimed in claim 1, the combination of a film presser plate, a guideway parallel with the optical axis of the objective and along which said film presser plate is adapted to be shifted in the space separating the latter from the beam-projecting means between a forward position for which said plate holds the cooperating film in its operative position adjacent the objective and a rear position to the rear of the location of said film extending rectilinearly between the corresponding spools, a longitudinal slideway, a pusher member slidingly carried inside said slideway and adapted when operated to shift the cooperating section of said film forwardly to form a loop extending into proximity with the objective, and means whereby the pusher member controls the forward movement of the film presser plate along its guideway.

5. In the apparatus claimed in claim 1, the combination of a film presser plate, a guideway parallel with the optical axis of the objective and along which said film presser plate is adapted to be shifted in the space separating the latter from the beam-projecting means between a forward position for which said plate holds the cooperating film in its operative position adjacent the objective and a rear position to the rear of the location of said film extending rectilinearly between the corresponding spools, a longitudinal slideway, a pusher member slidingly carried inside said slideway and adapted when operated to shift the section of the cooperating film forwardly to form a loop extending into proximity with the objective, means whereby the pusher member controls the forward movement of the film presser plate along its guideway with a delay between the movements of said two parts, and elastic means urging the pusher member back into its inoperative rear position independently of the film presser plate.

6. In the apparatus claimed in claim 1, the combination of a film presser plate, lateral members rigid with the presser plate, a control plate rigid with the lateral members, a guideway parallel with the optical axis of the objective, and along which said control plate is adapted to be shifted to make the film presser plate move inside the space separating the objective from the beam projecting means between a forward position for which said plate holds the cooperating film in its operative position adjacent the objective and a rear position to the rear of the location of said film extending rectilinearly between the corresponding spools, a longitudinal slideway, a pusher-member slidingly fitted in said slideway and adapted when operated, to shift the medial section of said cooperating film forwardly to form a loop extending into proximity with the objective ahead of the presser plate, longitudinal rods rigid with the pusher member, forks rigid with the control plate and slidingly engaging the longitudinal rods, stops carried by the pusher member and adapted to engage the forks to thereby shift forwardly the film presser plate after said pusher member has traveled alone over a predetermined path, and a spring urging the pusher member rearwardly.

References Cited by the Examiner

UNITED STATES PATENTS

| | | | |
|---|---|---|---|
| 2,345,869 | 4/1944 | Edwards | 352—123 |
| 3,164,059 | 1/1965 | Turrentine | 352—123 X |
| 3,185,027 | 5/1965 | Hodges et al. | 88—24 |

JULIA E. COINER, *Primary Examiner.*